United States Patent [19]

Triola

[11] Patent Number: 5,172,484
[45] Date of Patent: Dec. 22, 1992

[54] ANGLE MEASURING DEVICE FOR PERIPHERAL GRINDING WHEELS WITH TOOL RESTS

[76] Inventor: Thomas Triola, 1210 Tumbleweed St. NE., Uniontown, Ohio 44685

[21] Appl. No.: 701,471

[22] Filed: May 16, 1991

[51] Int. Cl.⁵ .............................................. B27G 23/00
[52] U.S. Cl. ........................................ 33/534; 33/626; 33/1 N; 33/403
[58] Field of Search ................. 33/626, 637, 638, 640, 33/641, 534, 1 N, 465, 196, 643, 403; 51/220, 221 R, 221 BS, 239, 102

[56] References Cited

U.S. PATENT DOCUMENTS

| | | | |
|---|---|---|---|
| 1,756,710 | 4/1930 | Tuttle. | |
| 2,607,121 | 8/1952 | Wiedebusch. | |
| 2,623,337 | 12/1952 | Falls | 51/239 |
| 3,436,872 | 4/1969 | Warren | 51/218 |
| 3,501,871 | 3/1970 | Anderson | 51/238 R |
| 3,861,088 | 1/1975 | Brieco | 51/216 A |
| 4,142,331 | 3/1979 | MacJannette | 51/102 |
| 4,607,459 | 8/1986 | Rees | 51/102 |
| 4,766,675 | 8/1988 | Liu | 33/529 |
| 4,779,354 | 10/1988 | Hill | 33/403 X |

FOREIGN PATENT DOCUMENTS 540850 10/1941 United Kingdom ................. 51/239

OTHER PUBLICATIONS

Thomas Triola, Engineering Notebook, p. 3, Mathematical Basis for the Tool Aug. 25, 1989.

Primary Examiner—Harry N. Haroian

[57] ABSTRACT

A device to accurately define the angle relationship between a peripheral grinding wheel and it's tool rest in the vertical plane. The device uses the wheel periphery and tool rest surface to control the angle between the two. It is an 400 accessory to existing grinders. It is a separate device from the grinder enabling it to be used on several machines. It is not required structure for the grinding operation.

16 Claims, 5 Drawing Sheets

ANGLE MEASURING DEVICE FOR PERIPHERAL GRINDING WHEELS WITH TOOL RESTS

FIELD OF INVENTION

This invention is a device to define the vertical angle between a peripheral grinding wheel and its tool rest.

BACKGROUND

Peripheral grinding wheels with tool rests are commonly used. In practice, a part is placed on the grinder's tool rest and advanced into the rotating wheel along the tool rest, to grind material from the part to obtain a new surface, matching the wheel contour. When appropriate, it is desirable to know or control the angle ground into a part before it is ground to prevent guessing and wasted effort. This can be accomplished by finding a measurable geometric relation for the part and the grinding wheel set-up. When the part is on the grinding wheel and viewed from the center line of the grinding wheel, an end view, the ground contour in the vertical plane is commonly identified by an acute angle. See FIG. 4. The angle on the part is formed from an imaginary line passing through the end points of the contour intersecting with a line corresponding to the body of the part, usually registering on the tool rest. The intersection of these two lines, the vertex of the angle, can be considered the effective pivot point, controlling the angle ground on the part. This effective pivot point is the common feature between the newly ground and existing register surface of the part guided by the tool rest. Similarly for the grinding wheel, this same effective pivot point is a way to locate the tool rest's angular position relative to the wheel contour. The effective pivot point coincides with the intersection of the wheel periphery and the tool rest plane. The wheel periphery is identical to the ground contour and the register surface of the part follows the tool rest plane. With the effective pivot point identified it then is possible to describe the geometric relationship between the grinding wheel contour and the tool rest plane. In this way it can be recognized that the effective pivot point is a critical feature in determining both the grinding wheel set-up and the angle ground into a part.

Tool rests, however, are typically pivoted about a convenient point on the machine frame away from the wheel periphery and not at the effective pivot point. A tool rest pivot point removed from the wheel periphery merely serves as a convenient way to mark the change in the tool rest angle, not define it. The effective pivot point and not the machine frame pivot must be considered in order to define the geometric relationship between the wheel periphery and its tool rest in a vertical plane. The angle formed by the contour ground into a part should be determined by wheel contour (size) and the location of the tool rest plane relative to the intersection between these two surfaces. It is the combination of these two surfaces relative to the effective pivot point that determines the angle on the part.

Up to now, controlling the ground angle has been limited to positioning apparatus integral to the grinding wheel machine or required trial and error with post grinding measurement using a protractor or gaged comparators, time consuming practices.

This invention is a separate angle measuring device that provides accurate angle definition of the machine set-up in the vertical plane. It is an accessory to existing equipment. It can be used for any conventional angle between 0 degrees and 90 degrees and can be used on more than one grinder.

DESCRIPTION OF PRIOR ART

U.S. Pat. No. 3,501,871 dated Mar. 24, 1970 to E. A. Anderson et al shows a blade orienting attachment. It uses regularly spaced angle indicia with a tool rest pivot point located below the surface of the wheel on the machine frame. By virtue of the location of the pivot point the angle indicia do not indicate the angle of the tool rest relative to the wheel periphery. Anderson et al's device does not control the tool rest plane where it intersects the wheel diameter. The angle indicia then best serve only to indicate the change in angle of the tool rest relative to the machine frame and not the angle ground into the part. Anderson et al's device is firmly fastened to the grinding wheel structure, making it impractical to transfer to other grinders. It is also required structure for the grinding operation.

U.S. Pat. No. 4,607,459 dated Aug. 26, 1986 to Spencer Rees shows an entire grinding machine with tool rest angle indicating mechanism. This patent requires the structure of the machine to indicate the angle to be ground, rendering the built-in angle indication mechanism not transferrable to other units. The angle indicating mechanism is an adjustable slot with only commonly used angles marked on it. This limits the selection of the indicating mechanism to only those angles marked. Further, if an uninterrupted scale were provided, the shape of the slot would require a non-linear scale to include all angles, complicating angle definition in practice.

U.S. Pat. No. 4,142,331 dated Mar. 6, 1979 to Barrie MacJannette is a blade sharpening attachment to a grinding machine. This device exhibits control of the angle ground into a part, but with no way of identifying that angle. It is required structure for the grinding operation, rigidly fastened, and not easily transferrable to other grinders.

U.S. Pat. No. 1,756,710 dated Mar. 12, 1928 to Martin Tuttle is a grinding machine with tool rest angle indicating mechanism. The angle indicating device is required structure for the grinding operation, rigidly fastened to the frame, making it not readily transferrable to other grinders. The angle indicating mechanism seeks to maintain the tool rest perpendicular to the tangent of the grinding wheel, a single angle setting. It affords no means to identify other angles to the tool rest relative to the wheel.

U.S. Pat. No. 3,436,872 dated Apr. 8, 1969 to Eugene Warren is a tool positioning protractor. It attaches to the tool rest to determine the horizontal angle of the tool relative to the grinding wheel. The device is required structure for the grinding operation and not readily transferable to other grinders. The vertical angle is controlled using different support plate thicknesses to change the part and tool location relative to the centerline of the wheel. This does not identify the vertical angle; it only allows for positioning to different elevations relative to the wheel centerline.

U.S. Pat. No. 2,623,337 dated Dec. 30, 1952 to John J. Falls is a protractor tool guide to adjust the horizontal angle of the tool relative to the grinding wheel. It is required structure for the grinding operation and does not define the vertical angle of the tool relative to the grinding wheel.

U.S. Pat. No. 3,861,088 dated Jan. 21, 1975 to Rocco F. Brieco is a fixture for supporting a tool subject to surface grinding. This fixture, while providing accurate angle measurement, is not suited for peripheral grinding machines. It provides angle indication between 2 flat surfaces, not a diameter (grinding wheel periphery) and a flat surface (tool rest) used by peripheral grinders.

U.S. Pat. No. 4,766,675 dated Aug. 30, 1988 to Bao-Shen Liu is an angle measuring instrument. It provides angle measurement between 2 straight or flat surfaces, not suitable for use with peripheral grinders that require coordination between a curved and flat surface.

U.S. Pat. No. 2,607,121 dated Aug. 19, 1952 to H. S. Wiedebusch is an angle measuring instrument. It, too, provides angle measurement between 2 straight or flat surfaces, not suitable for use with peripheral grinders that require coordination between a flat and curved surface.

OBJECTS AND ADVANTAGES

Accordingly, several objects and advantages of my invention are a separate angle measuring device that uses the grinding wheel periphery and the plane of the tool rest to define the vertical angle between the two. It establishes the effective pivot point for angle definition at the intersection of the tool rest plane and the periphery of the grinding wheel, the true controlling point for ground angle definition. It is a separate device that can be used on several grinding machines. It is not required structure during the grinding operation. It is an accessory that is immediately adaptable to existing equipment. It can be used on grinders with or without guards to accommodate limited exposed portions of the wheel. It will accommodate various locations of the tool rest for a given angle relationship i.e., high or low on the wheel. It can also be used with tool rests that extend around the periphery on both sides of the wheel, a common tool rest feature.

The prior art provides only approximations or limited choices of the ground angle with apparatus that is built in and not conveniently transferrable to other grinders. Some versions of the prior art require substantial portions of the wheel to be exposed to use their apparatus and other versions limit the tool rest location for a given angle.

Further objects and advantages of my invention will become apparent from a consideration of the drawings and ensuing description of it.

| List of References | |
|---|---|
| 7 | Grinding wheel |
| 8 | Grinding wheel tool rest |
| 10 | Angle measuring device |
| 12 | Flat body pLate |

| -continued | |
|---|---|
| List of References | |
| 14 | Base flange |
| 16 | Tool rest face |
| 18 | Pivot edge |
| 20 | Base edge |
| 22 | Circular arc |
| 24 | Bottom edge |
| 26 | Center point |
| 28 | Radial slot |
| 30 | Scale indicia |
| 32 | Indicator |
| 34 | Indicator guide step |
| 36 | Indicator locator step |
| 38 | Indicator pointer face |
| 40 | Indicator edge |
| 42 | Screw thread fastener |
| 44 | Alternate embodiment |
| 46 | Plate |
| 48 | Base edge |
| 50 | Face |
| 52 | Base locator edge |
| 54 | Step locator edge |
| 56 | Second base locator edge |
| 58 | Second step locator edge |
| 60 | Second base edge |

DESCRIPTION OF INVENTION

Figure 1:
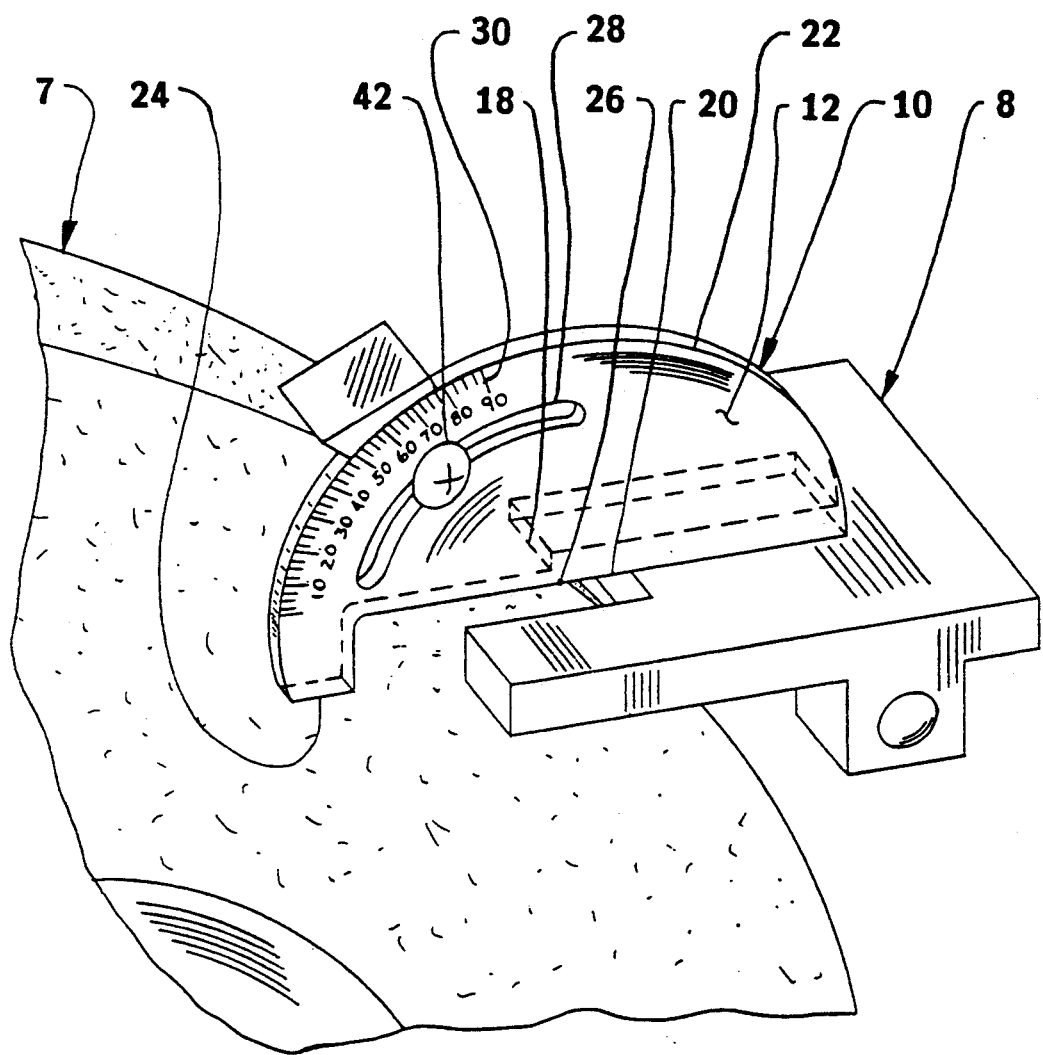
FIG. 1 is an isometric front view of my invention.
Figure 2:
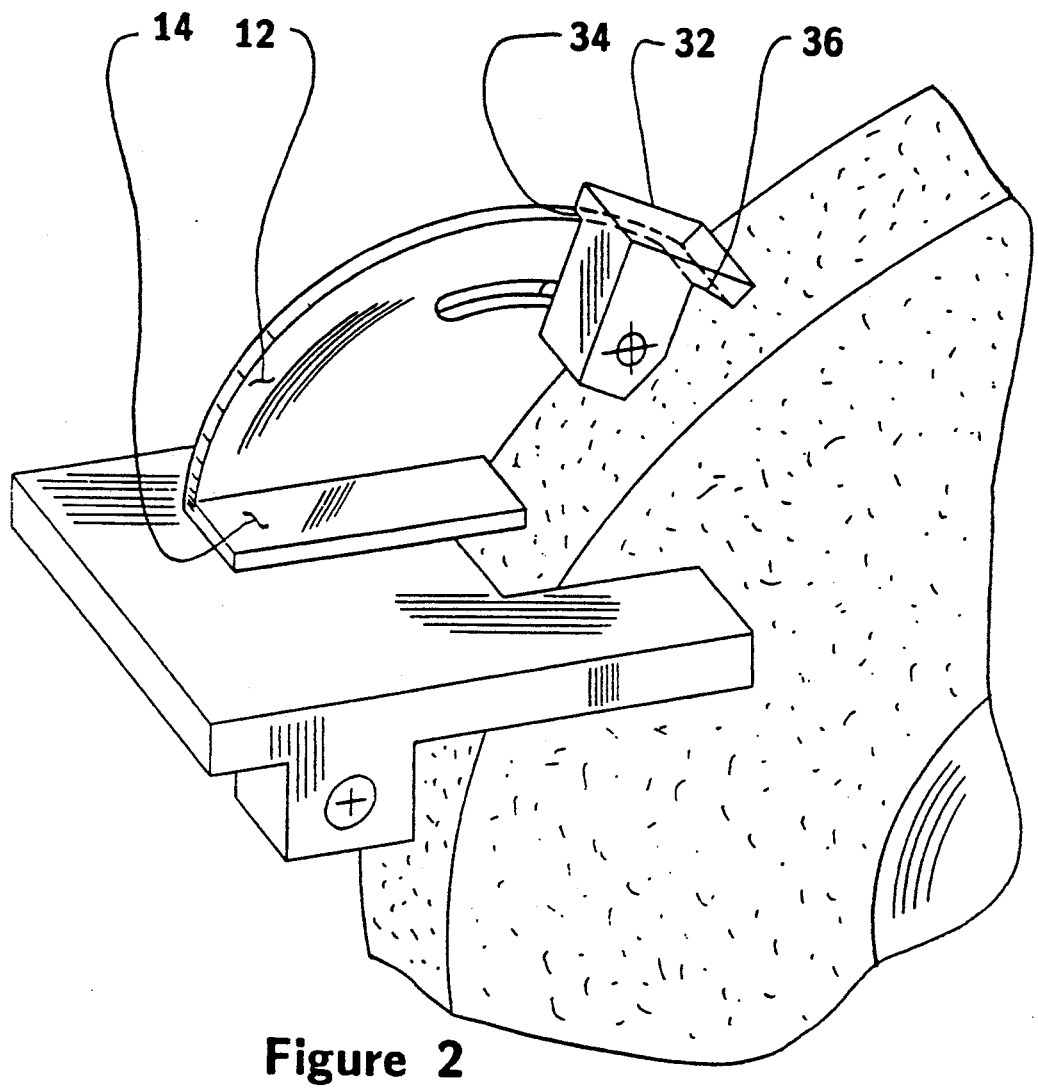
FIG. 2 is an isometric rear view of my invention.
Figure 3:
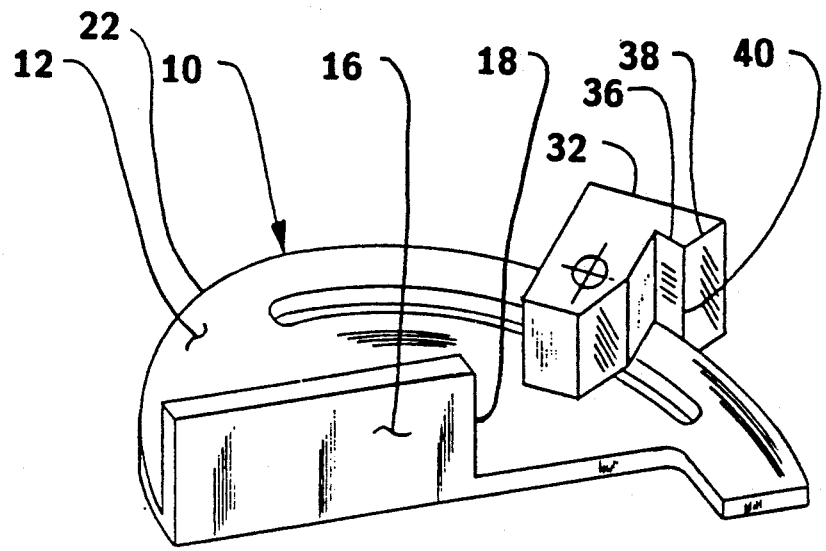
FIG. 3 is an isometric rear bottom view of my invention.

FIG. 1 shows an isometric view of a typical grinding wheel 7, a typical tool rest 8, and a basic version of my angle measuring device 10. FIG. 2 shows flat body plate 12 that is preferably a constant thickness plate with base flange 14 extending perpendicular to it. FIG. 3 shows device 10 on its side to depict tool rest face 16 and pivot edge 18. Body plate 12 is shaped by base edge 20 along its length that is coplanar with tool rest face 16. Returning to FIG. 1, body plate 12 is also shaped by circular arc 22 and bottom edge 24. Pivot edge 18 is perpendicular to base edge 20. The center point 26 of arc 22 is colinear with and lies on the base edge 20 and is directly in line with pivot edge 18. It is critical that pivot edge 18 be perpendicular to base edge 20 and colinear with center point 26. Radial slot 28 is concentric with arc 22 and extends through the thickness of body 12. Scale indicia 30 are located on the front face of body 12 and for this preferred embodiment placed along arc 22. FIG. 2 shows indicator 32 is a stepped block on two (2) adjoining sides. One of those steps is indicator guide step 34 that is shown similar in thickness to body 12. The other adjoining step is indicator step 36 which is perpendicular to step 34 and is also longer. FIG. 3 shows the end of indicator step 36 is indicator pointer face 38 and indicator edge 40. It is critical that indicator edge 40 be perpendicular with body plate 12 and parallel with pivot edge 18. Indicator 32 contacts body 12 along the back face of body 12 and along arc 22. Returning to FIG. 1, indicator 32 is held fast to body 12 using screw thread fastener 42. Screw 42 passes through slot 28 and is threadedly received into indicator 32.

Figure 4:
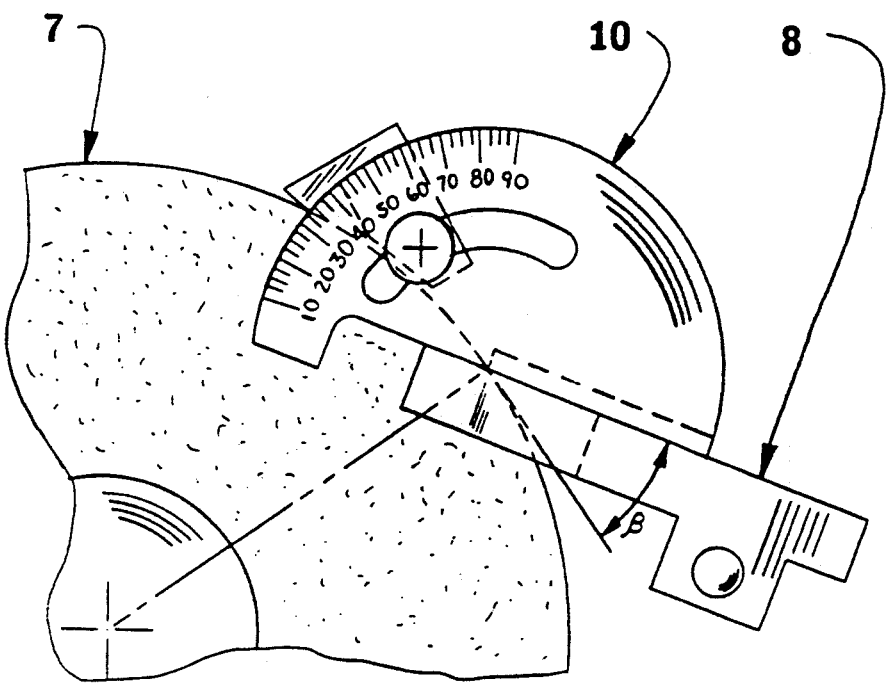
FIG. 4 is a front view of my invention.

FIG. 4 shows the relationship of device 10 with grinding wheel 7 and tool rest 8. In this preferred embodiment pivot edge 18 and indicator edge 40 are the only features to contact the wheel 7 periphery. The back of body 12 contacts the wheel 7 face and is parallel to it. Tool rest face 16 contacts tool rest 8 and is coplanar with its top surface.

Device 10 is constructed to indicate the angle $\beta$ of FIG. 4 between the tangent line to the wheel periphery at the effective pivot point described above and the tool rest plane. When viewing the angle from the center line of the grinding wheel as in FIG. 4, locating the scale indicia 30 on body plate 12 is done by determining the 90 degree or "square" angle setting on body plate 12 and proceeding from there to position the scale indicia 30 per the center point 26. This is done by placing base edge 20 in line with the grinding wheel 7 axis of rotation and putting center point 26 on the wheel 7 periphery. Where the wheel 7 periphery and body plate 12 contours meet is the location of the 90 degree angle setting for angle $\beta$.

Figure 5:
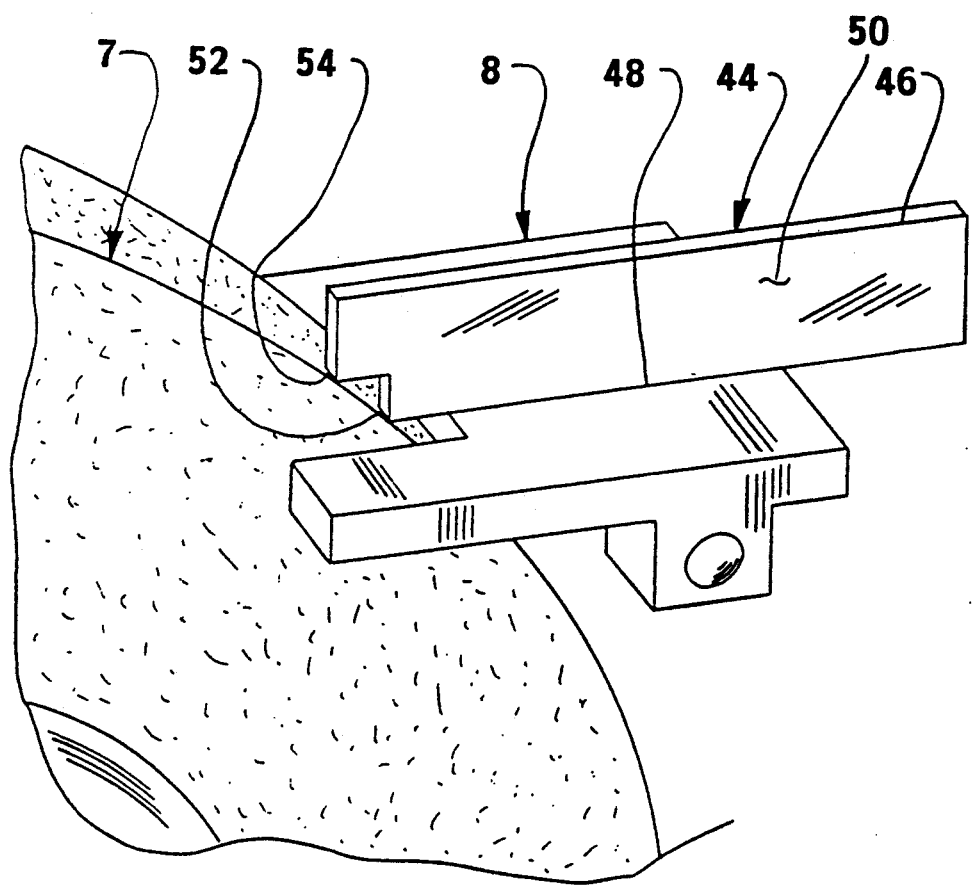
FIG. 5 is an isometric view of an alternate embodiment of my invention.

FIG. 5 shows alternate embodiment 44 similarly positioned with wheel 7 and tool rest 8. It is a plate 46 with preferably constant thickness having base edge 48 and face 50. A step or recess is formed at one end of plate 44 whose corners result in base locator edge 52 and step locator edge 54. Base edge 52 is perpendicular to face 50. Step edge 54 is parallel to base edge 52. In this preferred embodiment edges 52 and 54 are the only features to contact the wheel 7 periphery. Base edge 48 rests on tool rest 8 and is coplanar with its top surface. The step or recess can have 2 or more points of wheel 7 periphery contact and is constructed to yield the angle $\beta$ between the tangent line to the wheel 7 periphery at the effective pivot point and the tool rest 8 top plane as shown in FIG. 4. Analytical or graphical techniques may be used to define the step or recess configuration.

Figure 7:
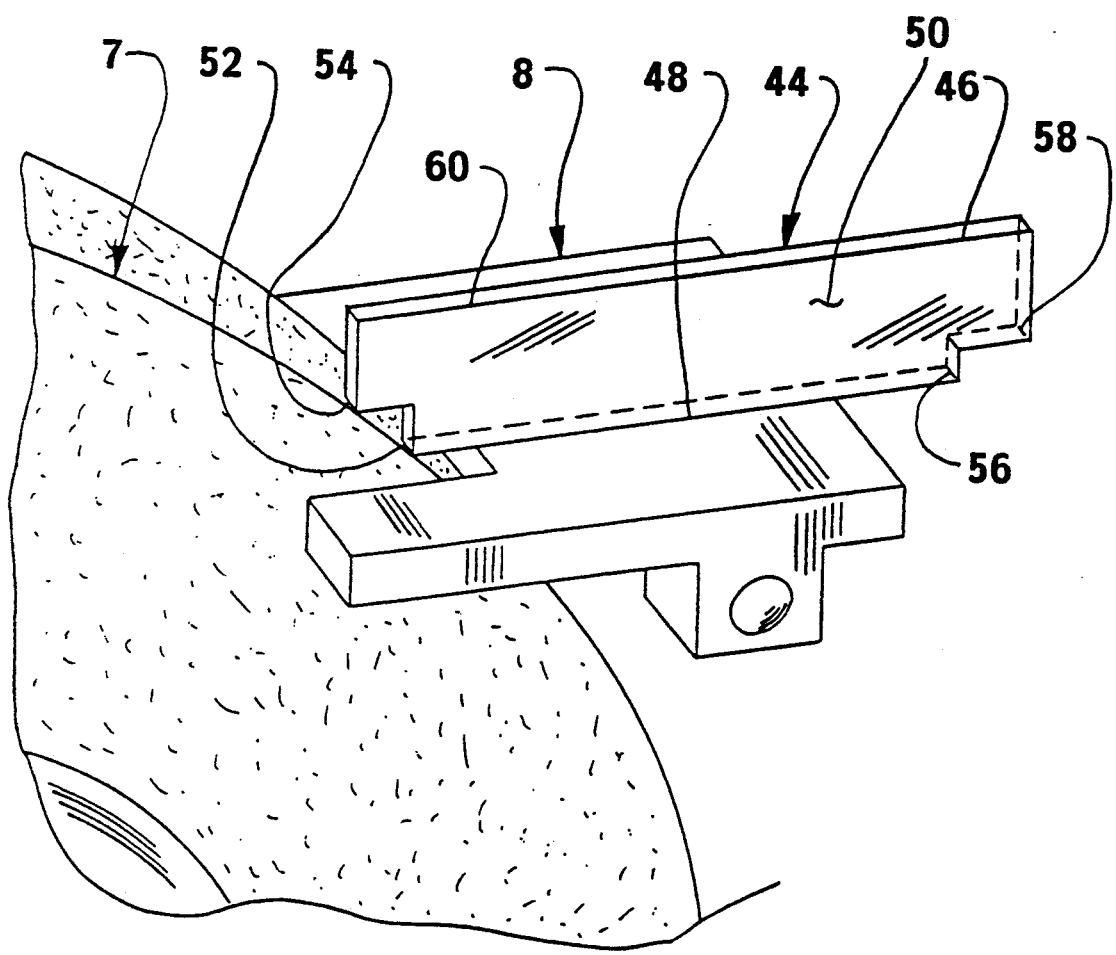
FIG. 7 is an isometric view of an alternate embodiment of my invention.

FIG. 7 illustrates some modifications that can be made to alternate embodiment 44. As in the alternate embodiment, the plate 46 with a preferably constant thickness having a base edge 48 rests on a tool rest. A recess or step is formed at one end of plate 46 whose corners result in a base locator edge 52 and a step locator edge 54, both of which contact the wheel 7 periphery. The modification comprises a second recess or step located at the other end of the plate 46 comprising a second base locator edge 56 and a second step locator edge 58. The dimensions of the second recess or step may so configured to define the same angle as or a different angle from the angle defined by the first recess or step.

A further modification to alternate embodiment 44 lies in having a plate 46 with one or more base edges. FIG. 7 shows a second base edge 60 which can be made to rest on the tool rest and function in the same way as the first base edge by forming a step(s) or a recess(es) (not depicted) to define the angular relationship between the wheel 7 periphery and the tool rest 8.

The preferred embodiment 10 and alternate embodiment 44 are made of steel for dimensional stability and long life. Other materials can be used that provide a rigid structure; brass, aluminum, wood, ceramics, plastics, etc.

OPERATION OF INVENTION

The operation of angle measuring device 10 as shown in FIG. 1 to set the tool rest angle before grinding is done by setting the device to the desired angle and then placing it on a grinder and adjusting the set-up. To establish the tool rest angle before grinding, set the angle measuring device 10 to the desired angle by moving the indicator edge 40 to the desired angle above scale indicia 30. Tighten screw 42 while keeping the edge 40 at the desired angle and in contact with arc 22. Place tool rest face 16 on the grinder's tool rest 8 along its length with the back face of body plate 12 contacting the grinding wheel 7 face. Move the combination of device 10 and grinder tool rest 8 until pivot edge 18 and indicator edge 40 both contact the wheel 7 periphery.

Secure the tool rest 8 into position. Remove the device 10 from the grinder. The operation of angle measuring device 10 to measure the angle of a given grinder set-up is done in reverse order. Loosen screw 42 and move the indicator 32 to a remote setting. Place tool rest face 16 on a grinder's tool rest 8 along its length. Align it so the back face of body plate 12 contacts the grinding wheel 7 face and pivot edge 18 contacts the wheel 7 periphery. Move the indicator 32 along arc 22 until it also contacts the wheel 7 periphery. Record the angle indicated by edge 40 on scale 30 and/or tighten screw 42 to retain this setting for future use. Remove the device 10 from the grinder.

The alternate embodiment 44 of this invention can be used to set the tool rest 8 to a predetermined angle in similar fashion. Place base edge 48 on the tool rest 8 of a grinding wheel 7 with face 50 parallel to the wheel 7 face. Move the combination of the grinder's tool rest 8 and alternate embodiment 44 until locator edges 52 and 54 both contact the wheel 7 periphery. Secure the tool rest into position. Remove the device 44 from the grinder.

Modified alternate embodiment 44 as illustrated in FIG. 7 can be made to operate in the same fashion to define a different angular relationship by placing base edge 48 on the tool rest 8 and moving the combination of the tool rest 8 and plate 46 until the second locator edges 56 and 58 both contact the wheel 7 periphery. The tool rest 8 is secured into position and the plate 46 removed from the grinder. Likewise, the same procedure is followed to define an angular relationship between the tool rest 8 and the wheel 7 periphery when the plate 46 has a second base edge 60 with a step(s) or recess(es).

Figure 6:
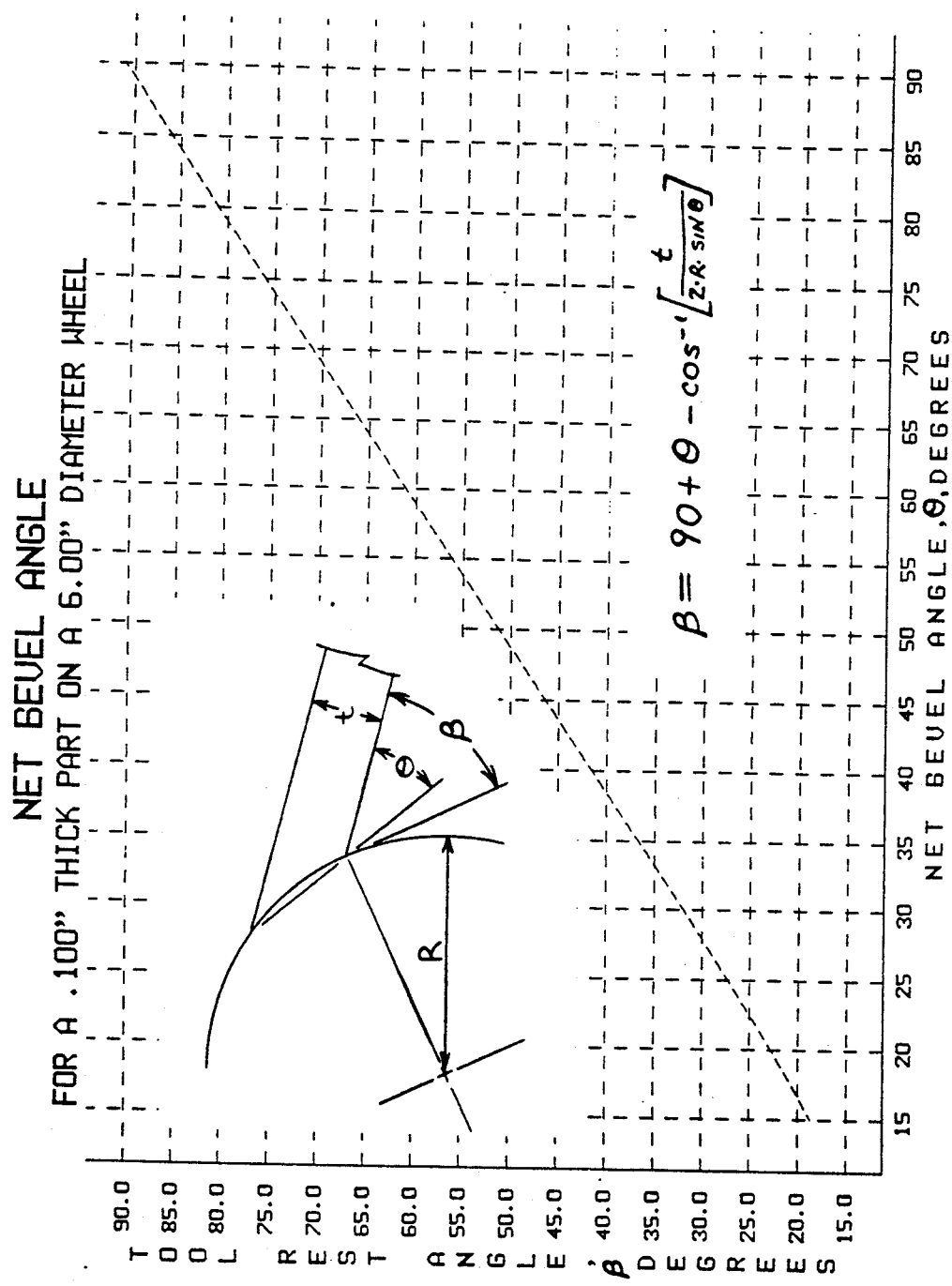
FIG. 6 is a supplemental illustration of the ground angle's relationship to part thickness.

FIG. 6 is a supplemental illustration showing the relationship of ground angle and part thickness. While the influence of part thickness on the ground angle is small for most applications, it is provided here so a user can achieve exact angle settings for any peripheral grinding application. FIG. 6 contains a graph with corresponding equation for the tool rest angle versus the actual angle on the part for a given part thickness and wheel size. The equation shown is used to construct the graph where "R" is the wheel radius, "t" is the part thickness, "$\theta$" is the actual angle on the part, and "$\beta$" is the tool rest angle as shown in FIG. 4. The graph illustrates the typical example of a 6" bench grinder (R=3.00") used to sharpen a wood plane blade (t=0.10") showing that for a desired angle of 30 degrees ($\theta$=30) on the plane blade, a tool rest angle of 31.9 degrees ($\beta$=31.9) is required. This equation is not the only means to define the relationship between actual angle, tool rest angle, and part thickness. Other analytical or graphical techniques may be employed. The above is presented in order to provide one version of a complete solution for ground contour angle definition when using a peripheral grinder.

CONCLUSIONS, RAMIFICATIONS, SCOPE OF INVENTION

Thus the reader will see that the angle measuring device 10 and alternate embodiment 44 provide accurate, portable, simple, and economical devices that can be used with peripheral grinders by persons of almost any age.

While my above description contains many specificities these should not be construed as limitations on the scope of the invention, but rather as an exemplification of one preferred embodiment and one alternate embodiment thereof. Many other variations are possible. For example: devices that use linear rather than radial body plate contour; or devices with matching wheel contour rather than point contact on the grinding wheel periphery; or devices having the flat plate with a separate base flange attached to it; or devices without an indicator block. The variations will all show that contact with the wheel periphery is used to establish the location between the wheel periphery and the plane of the tool rest in order to identify the angle between the two. This location could be anywhere on the wheel periphery but preferably has 1 point at the intersection with the tool rest plane. Accordingly, the scope of this invention should be determined not by the embodiments illustrated, but by the applied claims and their legal equivalents.

What I claim is:

1. A separate measuring device to define the angular relationship between a peripheral grinding wheel and it's tool rest in a vertical plane comprising:
    A) In combination, a flat body plate with angle indicating means having a base edge of said plate colinear with a center point of said angle indicating means, and
    B) A base flange perpendicular to said flat plate and having a pivot edge perpendicular to said base edge and coincident with said center point, and
    C) An indicator having the indicator edge perpendicular to said flat plate and parallel to said pivot edge with said indicator edge longer than the thickness of said flat plate and secured to said flat plate with fastening means.

2. The measuring device of claim 1 wherein the shape of said plate above the base edge is arcuate in shape.

3. The measuring device of claim 1 wherein said flange is a separate block joined to said flat plate by fastening means.

4. The measuring device of claim 1 wherein said flange is integral with said flat plate.

5. A separate measuring device to define the angular relationship between a peripheral grinding wheel and its tool rest in a vertical plane comprising:
    A) In combination, a flat body plate with angle indicating means having a base edge of said plate colinear with a center point of said angle indicating means, and
    B) A base flange perpendicular to said flat plate and having a pivot edge perpendicular to said base edge and coincident with said center point.

6. The measuring device of claim 5 wherein the shape of said plate above the base edge is arcuate in shape.

7. The measuring device of claim 5 wherein said flange is a separate block joined to said flat plate by fastening means.

8. The measuring device of claim 5 wherein said flange is integral with said flat plate.

9. A separate device to define a particular angular relationship between a peripheral grinding wheel and its tool rest comprising:
    A) A plate with a base edge whereby said base edge contacts a grinding wheel tool rest, and
    B) A recess or step at one end of said base edge comprising a base locator edge and a step locator edge whereby two or more points of said recess contact a grinding wheel on it's periphery.

10. The device of claim 9 wherein a second recess or step is located at the other end of said base edge.

11. The device of claim 10 wherein the two said recesses define different angles.

12. The device of claim 9 wherein said plate contains two or more said base edges.

13. A method of defining a particular angular relationship between a peripheral grinding wheel and its tool rest comprising:
    A) Contacting a grinding wheel tool rest with a base edge of a plate, and
    B) Contacting a grinding wheel on its periphery with two or more points of a recess or step comprising a base locator edge and a step locator edge, said recess located at one end of said base edge.

14. The method of claim 13, comprising contacting said grinding wheel on its periphery with a second recess or step located at an other end of said base edge.

15. The method of claim 14 wherein said recess and the said second recess define different angles.

16. The method of claim 13, wherein said plate contains two or more said base edges.

* * * * *